Aug. 15, 1950     G. A. RHOADS     2,519,285
PICKUP FOR AUTOMATIC PIN SETTERS

Filed Dec. 15, 1947     3 Sheets-Sheet 1

Inventor
Gerald A. Rhoads

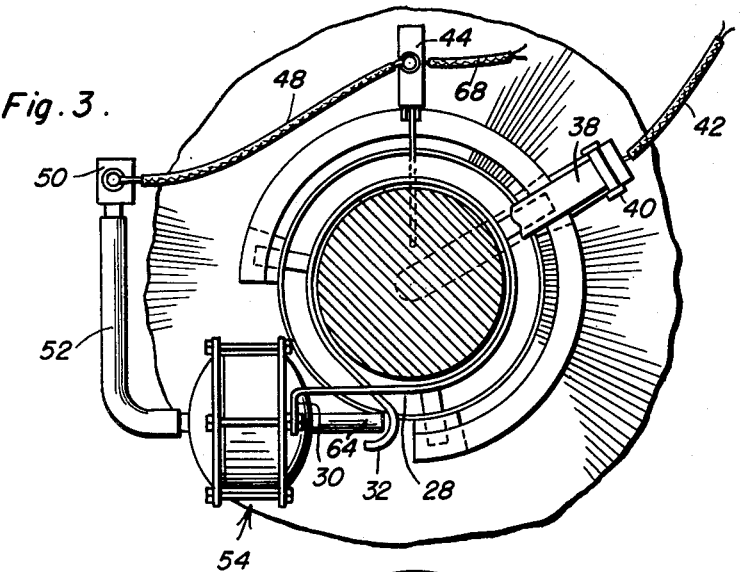
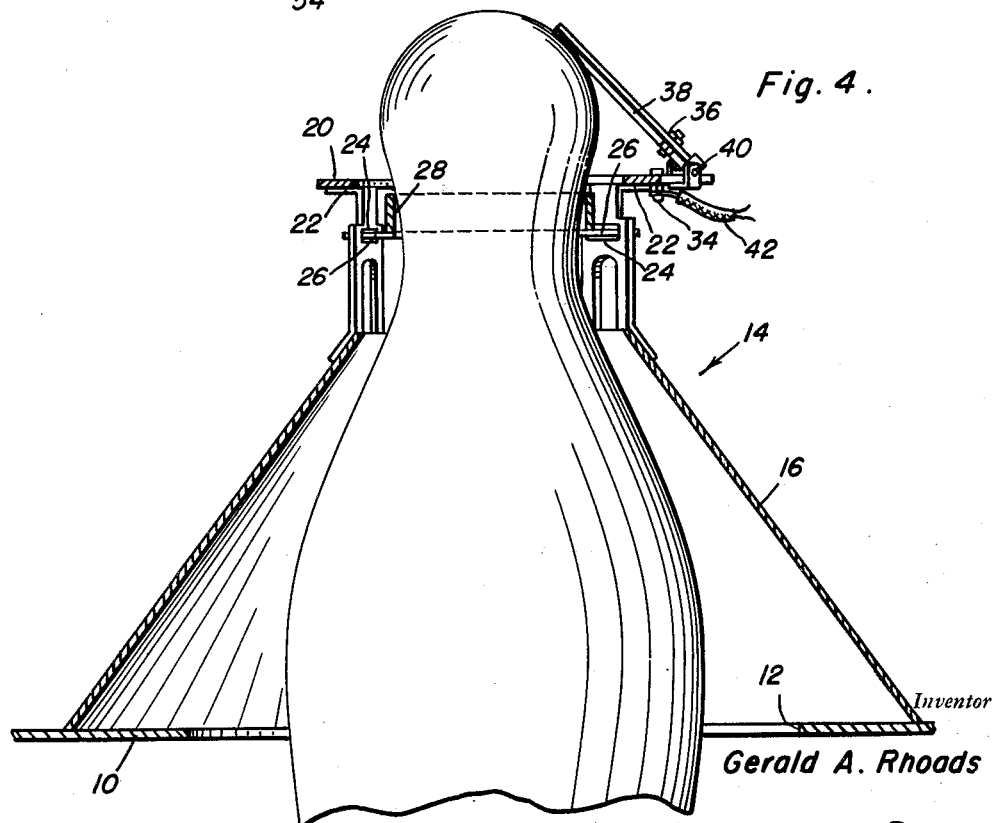

Aug. 15, 1950 G. A. RHOADS 2,519,285
PICKUP FOR AUTOMATIC PIN SETTERS
Filed Dec. 15, 1947 3 Sheets-Sheet 3

Inventor
Gerald A. Rhoads

By Clarence A. O'Brien
and Harvey B. Jackson
Attorneys

Patented Aug. 15, 1950

2,519,285

UNITED STATES PATENT OFFICE 2,519,285

PICKUP FOR AUTOMATIC PIN SETTERS

Gerald A. Rhoads, Safford, Ariz.

Application December 15, 1947, Serial No. 791,681

4 Claims. (Cl. 294—87)

This invention comprises novel and useful improvements in a pick-up for automatic pin setters and more specifically pertains to a self-adjusting and automatically operable pin pick-up for use with an automatic pin setter pick-up plate.

The principal object of this invention is to provide a pick-up device which is self-adjusting upon the pick-up plate in accordance with the position of the pin upon the alley to be gripped by the device, combined with novel clutch and clutch operating means associated therewith.

An important feature of the invention resides in providing a pick-up device which may be incorporated into conventional types of automatic pin setters and their operating electric circuits.

These, together with various ancillary objects and features, which will later become apparent as the following description proceeds, are attained by this device, a preferred embodiment of which has been illustrated, by way of example, as the principles of the invention only in the accompanying drawings, wherein:

Figure 3 is a horizontal plan detail view through the pick-up device showing the neck of a pin engaged thereby;

Figure 4 is a vertical transverse sectional view through one of the pick-up devices and a portion of a pick-up plate of a pin setter and showing a pin gripped therein;

Figure 6:
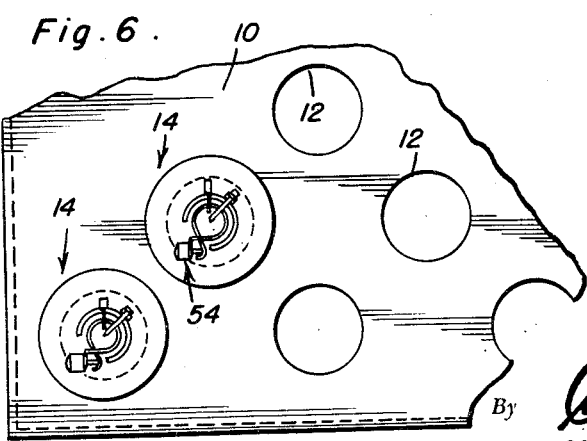
Figure 6 is a fragmentary top plan view of a portion of the carrier or pick-up plate of an automatic pin setting device, showing the manner in which the invention is applied thereto.

Referring now more specifically to the accompanying drawings, wherein like numerals indicate similar parts throughout the various views, attention is directed first to Figure 6, wherein there is disclosed a portion of a pick-up plate 10 of an automatic pin setting mechanism of a known and conventional type and which is provided with a plurality of appropriately spaced pin receiving apertures 12 which are properly spaced with respect to each other and the pin spots on a bowling alley to receive loosely the necks of pins which are placed on or adjacent their proper spots on the alley. This pick-up plate is automatically operated, by a means not shown but well understood in the art, by means of suitable electric circuits and operating mechanism, whereby the plate is raised or lowered to lift pins from the alley, and either replace those pins from the exact position from which they were lifted, or to position a complete set of pins in their proper positions or spots upon the bowling alley, in accordance with known practice.

Suitably attached to and slidable upon the pick-up plate 10, and in a position overlying the apertures 12, are a plurality of pick-up devices in accordance with this invention, one such device being provided for each of the apertures 12. These devices are indicated generally at 14 and as shown best in Figures 2, 4 and 5, comprise generally a frusto-conical base portion 16 whose lower end is open and of a diameter considerably greater than the aperture 12, whereby the axis of the frusto-conical member may be displaced from the axis of the aperture 12 in order to accommodate itself to the position of a pin which may be off-spot.

Figure 5:
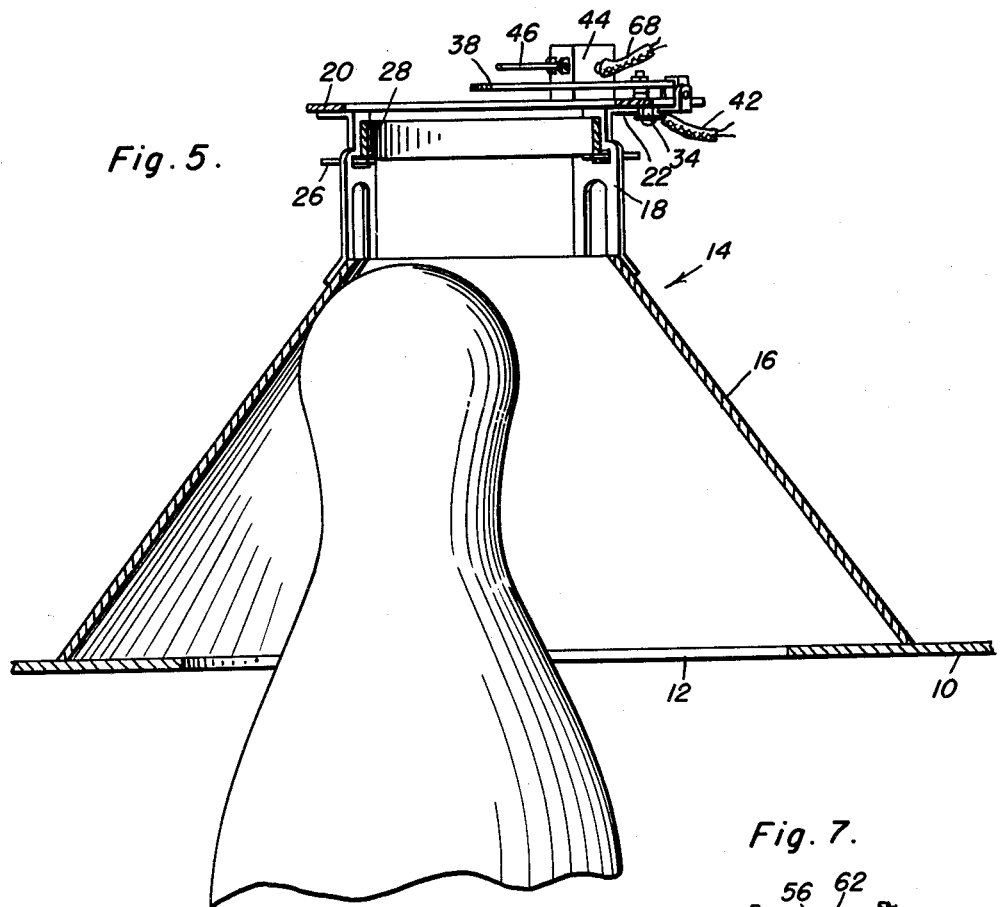
Figure 5 is a view similar to Figure 4 but showing the pin and pick-up device in a different position as before the pin has become fully engaged by the device.

As indicated in Figures 4 and 5, when the inner surface of the frusto-conical member 16 is engaged by the head of a pin which is off-spot, the pick-up device is laterally shifted upon the pick-up plate 10 until the device is centered with respect to the pin, as the latter is received in the aperture 12 while the plate 10 descends toward the alley. Secured by suitable supporting brackets 18 to the upper end of the frusto-conical member 16 of the pick-up device, is an annular, ring member 20 which is centrally apertured. This ring is secured upon lateral flanges 22 formed at the upper end of the bracket or support members 18. The brackets 18 are provided with horizontally disposed slots 24 through which extend in a freely slidable manner, the laterally extending lugs 26 of a flexible band 28 constituting a gripping means for a pin. The ends of the flexible band 28 cross or overlap as shown in Figure 3, and extend beyond the annular circuit in which the brackets 18 are disposed, and are provided with angular terminals or arms 30 and 32 which are operatively engaged by a fluid pressure operating means to be later described.

Figure 1:
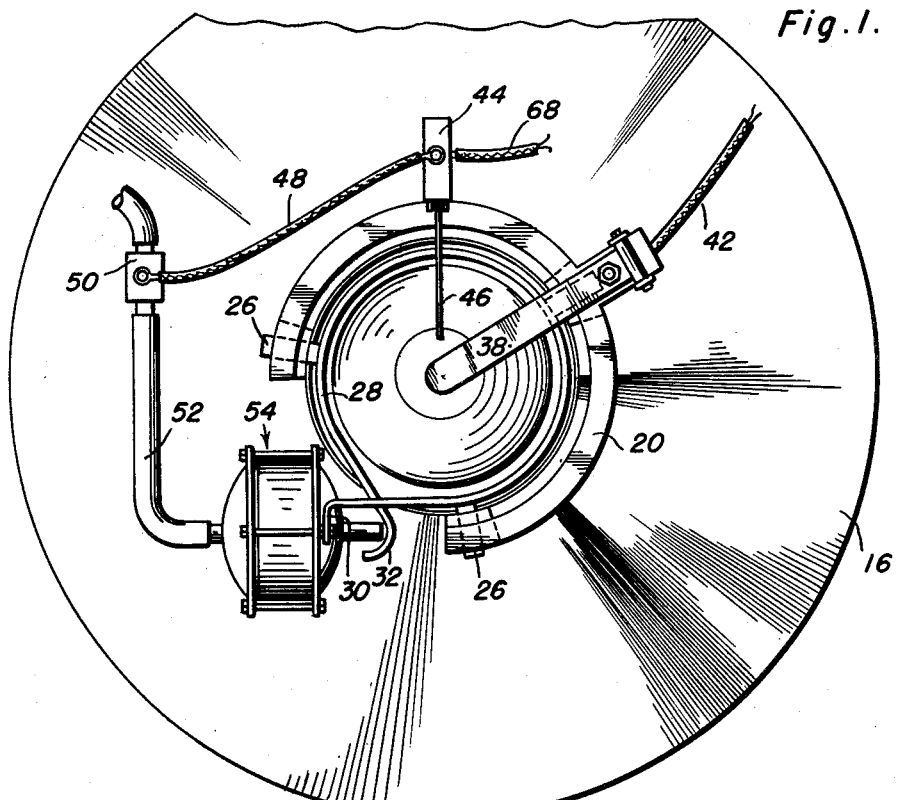
Figure 1 is a top plan view of a portion of one of the pick-up devices in accordance with this invention.
Figure 2:
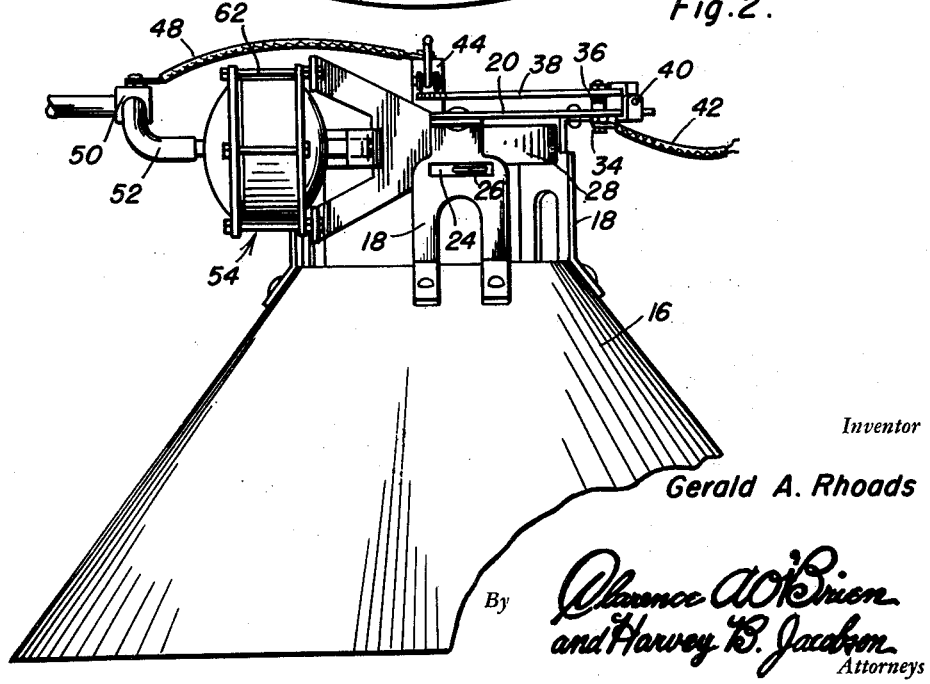
Figure 2 is a fragmentary side elevational view of the device of Figure 1.

Each of the pick-up devices has a pair of switches mounted on the annular ring 20 thereof, which switches control the operation of the pick-up device and of the pick-up plate, as will be seen by reference to Figure 2, and also from Figures 4 and 5, the ring 20 has an insulated electric contact 34 suitably secured thereto, this constituting a fixed terminal, while a movable terminal 36 is insulatingly mounted upon a switch arm 38 hingedly connected as at 40 to the ring 20. These two contacts 34 and 36 are electrically connected to electrical conductors in a conduit 42, the conduit 42 of each of the pick-up devices being connected in series with each other and with the operating circuit for raising and lowering the pick-up plate. These contact elements of the switch are normally closed, whereby the circuit is completed; but when one of the switches is opened, the circuit is broken and the cycle of movement of plate 10 for automatically positioning a full set of pins on the alley is interrupted.

The operating arms 38 of the switches are disposed over the openings in the ring 20 and upper open ends of the frusto-conical member 16, whereby the same may be engaged by the heads of any pins left standing on the alley and the circuit broken as shown in Figure 4, as the pick-up plate and pick-up device descends upon the pins.

Also mounted upon the ring 20 is a second switch indicated generally at 44 having an operating arm 46 spaced slightly above the operating arm 38 for engagement and operation by the neck of a pin, subsequent thereto. The switch 44 may be connected in series with a signal light, not shown, and is connected by an electrical conduit means 48 with an electromagnetically operated valve 50 controlling the flow of pressure fluid by means of a conduit 52 to a fluid pressure operating means indicated generally at 54. This operating means which may be pneumatic or hydraulic may be obtained from any suitable source, the source of supply forming in itself no part of this invention.

Figure 7:
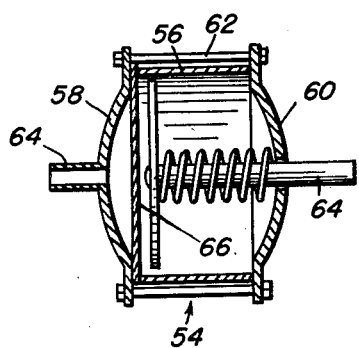
Figure 7 is a detail view in vertical longitudinal section through the pneumatic operating means of the pin gripping part of the device.

The hydraulic operating means 54, as shown in Figure 7, comprises a hollow cylindrical casing 56 provided with convexly shaped head plates 58 and 60, secured thereto into a unitary construction as by fastening means 62. From the head plate 58 extends a tubular boss 64 to which is connected the fluid pressure conduit 52, while the other head plate 60 is suitably apertured to receive an operating rod 64 whose inward extremity extends within the cylindrical casing and is clamped to a flexible diaphragm 66 secured and sealed at its periphery between the cover plate 58 and the cylindrical casing 56.

It will thus be seen that when the pressure fluid is supplied by opening the electro-magnetic control valve 50 through the switch 44, it expands the chamber formed between the diaphragm 66 and cover plate 58, thereby urging the rod 64 outwardly from the device. One of the terminals of the flexible retaining strip such as terminal 30 is anchored to the casing 56 in any suitable manner, while the other terminal 32 is engaged by the extremity of rod 64. Consequently, outward movement of the rod serves to separate the terminals 30 and 32 and thereby tension the retaining strip 28 about the neck of a pin as indicated in the drawings, to securely grip the same. A source of current is connected to each of the switches 44 as by a conduit 68, each of these conduits 68 being disposed in parallel, whereby each switch 44 is independently connected to a source of electrical energy.

The operation of the device is as follows. Assuming that the pins are properly positioned upon a bowling alley, and a first ball has been thrown, those pins lying upon the alley are removed. In order to effect this, the operating electrical circuit of the pick-up plate is energized, and the plate is caused to descend, with the apertures 12 descending upon and encircling any pins remaining standing on the alley, even though displaced from their original spot positions. As the displaced pin engages the inner surface of the frusto-conical member 16, the latter is shifted until it is centered upon the pin, and after predetermined movement caused by the continuing downward travel of the pick-up plate, the top of the pin engages and actuates the switch lever 38, this breaking the electric circuit of the automatic setting mechanism, each of the switches 36 being connected in series therewith. The pin or pins actuating the switch arm 38 also operate switch 44, thus operating the clutch or pin retaining strip.

In accordance with conventional practice, in the operation of these automatic pin setters, the pick-up plate is now raised carrying with it any pins which remain standing upon the alley, whereby the pins laying down may be raked off the alley, and the device again lowered to replace the lifted pins in their original positions. Alternatively, the device can be filled with a full set of pins in properly spotted positions and lowered and these pins returned to the alley by releasing in any suitable manner, not shown, the automatic pin gripping and retaining mechanism. If no pins remain on the alley, when the plate 10 is lowered, none of the switches 36 will be operated and the operating sequence of raising the empty plate and then returning the same, loaded with pins will be automatically carried out.

From the foregoing, the manner of constructing and operating the device will now be readily understood and accordingly, further explanation is believed to be unnecessary. Since numerous modifications will readily occur to those skilled in the art after a consideration of the foregoing specification and accompanying drawings, it is not intended to limit the invention to the exact construction shown and described, but all suitable modifications and equivalents may be resorted to falling within the scope of the appended claims.

Having described the invention what is claimed as new is:

1. In an automatic pin setter having a pick-up plate with a plurality of apertures each positioned to loosely receive a pin and a pick-up device slidable on said plate over each aperture for self-centering about a pin, said pick-up device comprising: a hollow cone shiftable on said plate to center itself upon a contractible pin, a housing on said cone, a pin engaging band in said housing, operating means for contracting said band to yieldingly grip a pin, actuating means controlling said operating means, a first switch controlling said actuating means, said switch being positioned in said housing for engagement with the head of a pin received in said cone, said operating means including a fluid actuated pump and a conduit for supplying fluid to the pump, said actuating means including an electromagnetic valve controlling the flow of fluid through the conduit and toward the pump.

2. In an automatic pin setter having a pickup plate with a plurality of apertures each positioned to loosely receive a pin and a pickup device slidable on said plate over each aperture for self-centering about a pin, said pick-up device comprising; a hollow cone shiftable on said plate to center itself upon a pin, a plurality of circumferentially spaced upwardly extending brackets secured to said cone, an annular ring member secured to said brackets, a flexible band, a plurality of laterally extending lugs secured to said band, said brackets having slots slidably receiving the lugs, said band having first and second overlapping end portions, a casing secured to the cone, a diaphragm mounted in said casing, a slidable rod carried by the housing, a pressure plate secured to the rod and disposed within the casing, means urging the rod and the pressure plate toward the diaphragm, a conduit connected to the casing and adapted to supply fluid into the casing for flexing the diaphragm and moving the rod and the pressure plate in one direction, said rod being secured to the first end portion of said band, the second end portion of said band being fixed to said casing, an electromagnetic valve controlling the flow of fluid through the conduit and into the casing, and a switch for actuating said valve, said switch being positioned in said housing for engagement with the head of a pin received in said cone.

3. The combination of claim 2 wherein the second end portion of said band is bifurcated and secured to said casing, the first end portion of said band being slidably received between the furcations of said bifurcated second end portion.

4. A pin setting device comprising a pick-up plate having a plurality of apertures therethrough, a pick-up device slidably mounted on said plate over each aperture for self centering about a pin, said pick-up device including a pin engaging flexible band, and means secured to said flexible band for selectively urging said flexible band into a contractible holding engagement with a pin.

GERALD A. RHOADS.

REFERENCES CITED

The following references are of record in the file of this patent:

UNITED STATES PATENTS

| Number | Name | Date |
|---|---|---|
| 1,883,598 | Dahl | Oct. 18, 1932 |
| 2,310,996 | Rundell | Feb. 16, 1943 |

FOREIGN PATENTS

| Number | Country | Date |
|---|---|---|
| 241 | Great Britain | Jan. 4, 1908 |